United States Patent
Pham et al.

(10) Patent No.: US 7,479,265 B2
(45) Date of Patent: Jan. 20, 2009

(54) CATALYTIC FILTER BASED ON SILICON CARBIDE (β-SIC) FOR COMBUSTION OF SOOT DERIVED FROM EXHAUST GASES FROM AN INTERNAL COMBUSTION ENGINE

(75) Inventors: Charlotte Pham, Saverne (FR); Laurie Pesant, Strasbourg (FR); Pierre Bernhardt, Heiligenberg (FR); Michel Wolf, Brumath (FR); Cuong Pham-Huu, Saverne (FR); Marc-Jacques Ledoux, Strasbourg (FR); Michel Kartheuser, Soufflenheim (FR); Estelle Vanhaecke, Strasbourg (FR)

(73) Assignees: SICAT, Paris (FR); Entre National de la Recherche Scientifigue, Paris (FR); Universite Louis Pasteur de Strasbourg, Strasbourg (FR)

( * ) Notice: Subject to any disclaimer, the term of this patent is extended or adjusted under 35 U.S.C. 154(b) by 657 days.

(21) Appl. No.: 10/963,604

(22) Filed: Oct. 14, 2004

(65) Prior Publication Data

US 2005/0159292 A1 Jul. 21, 2005

(30) Foreign Application Priority Data

| Oct. 16, 2003 | (FR) | ................................. | 03 12085 |
| Jul. 8, 2004 | (FR) | ................................. | 04 07635 |

(51) Int. Cl.
| | |
|---|---|
| *C01B 31/36* | (2006.01) |
| *B01J 20/00* | (2006.01) |
| *B01J 21/06* | (2006.01) |
| *B01J 21/18* | (2006.01) |
| *B01J 27/22* | (2006.01) |
| *B01J 27/224* | (2006.01) |
| *B01J 37/00* | (2006.01) |

(52) U.S. Cl. ...................... 423/345; 423/346; 423/439; 501/39; 501/80; 501/88; 502/158; 502/177; 502/178; 502/232; 502/407

(58) Field of Classification Search ................. 423/604, 423/345, 346, 439; 501/39, 80, 88; 502/158, 502/177, 439, 178, 232, 407; 96/108
See application file for complete search history.

(56) References Cited

U.S. PATENT DOCUMENTS 4,564,496 A * 1/1986 Gupta et al. ................... 264/44

(Continued)

FOREIGN PATENT DOCUMENTS

EP 0050340 4/1982

(Continued)

OTHER PUBLICATIONS

"An optimal NOx assisted abatement of diesel soot in an advanced catalytic filter design" by A. Setiabudi, M. Makkee and J.A. Moulijn, published in the Applied Catalysis B review: Environmental, vol. 42, p. 35-45 (2003).

(Continued)

*Primary Examiner*—Timothy C Vanoy
*Assistant Examiner*—Serena L Hanor
(74) *Attorney, Agent, or Firm*—Baker Donelson Bearman Caldwell & Berkowitz PC

(57) ABSTRACT

This invention relates to β-SiC foam parts with a specific surface area preferably equal to at least 5 $m^2/g$ and with at least two zones A and B with a different cellular porosity distribution, wherein the parts were made by chemical transformation of a porous precursor medium comprising at least two blocks A' and B', each having a different cellular porosity distribution, and in that the at least two zones A and B are derived from the chemical transformation of the two blocks A' and B'. This foam, optionally after deposition of an active layer, may be used as a filter medium in cartridges designed for the purification of exhaust gases. The invention also relates to manufacturing processes for preparing such a filter medium.

8 Claims, 6 Drawing Sheets

U.S. PATENT DOCUMENTS

| | | |
|---|---|---|
| 4,846,906 A | 7/1989 | Helferich et al. |
| 4,857,088 A | 8/1989 | Mizrah et al. |
| 4,871,495 A | 10/1989 | Helferich et al. |
| 4,912,076 A | 3/1990 | Mizrah et al. |
| 5,053,062 A | 10/1991 | Barris et al. |
| 5,429,780 A | 7/1995 | Prin et al. |
| 5,449,654 A | 9/1995 | Prin et al. |
| 5,958,831 A | 9/1999 | Prin et al. |
| 6,217,841 B1 | 4/2001 | Grindatto et al. |
| 6,251,819 B1 | 6/2001 | Prin et al. |
| 6,555,031 B2 * | 4/2003 | Gadkaree et al. ........... 264/29.7 |

FOREIGN PATENT DOCUMENTS

| | | |
|---|---|---|
| EP | 0160482 | 11/1985 |
| EP | 0313480 | 4/1989 |
| EP | 0440569 | 8/1991 |
| EP | 0511919 | 11/1992 |
| EP | 0543752 | 5/1993 |
| EP | 93/13303 | 7/1993 |
| EP | 0624560 | 11/1994 |
| EP | 1142619 | 10/2001 |
| EP | 1225311 | 7/2002 |
| FR | 2498471 | 7/1982 |
| FR | 2650628 | 2/1991 |
| FR | 2705340 | 11/1994 |
| FR | 2766389 | 1/1999 |
| FR | 2818163 | 6/2002 |
| GB | 2091584 | 8/1982 |
| JP | 7080226 | 3/1995 |
| WO | WO-00/01463 | 1/2000 |

OTHER PUBLICATIONS

"Performance and Durability Evaluation of Continuously Regenerating Particulate Filters on Diesel Powered Urban Bases at NY City Transport" by T. Lanni et al., in the SAE (Society of Automotive Engineers) publication No. 2001-01-0511.

Miwa, S. et al., "Diesel Particulate Filters Made of Newly Developed SiC", SAE International, SAE 2001 World Congress, Michigan, Mar. 5-8, 2001.

Merkel, G. A. et al., "Effects of Microstructure and Cell Geometry on Performance of Cordierite Diesel Particulate Filters", SAE International, SAE 2001 World Congress, Michigan, Mar. 5-8, 2001.

Nixdorf, R., et al., "Microwave-Regenerated Diesel Exhaust Perticulate Filter", SAE International, SAE 2001 World Congress, Mar. 5-8, 2001.

Merkel, G. A. et al., "Thermal Durability of Wall-Flow Ceramic Diesel Particulate Filters", SAE International, SAE 2001 World Congress, Mar. 5-8, 2001.

Ciambelli, P. et al., "Performances of a Catalytic Foam Trap for Soot Abatement", Catalysis Today, 2002.

* cited by examiner

CATALYTIC FILTER BASED ON SILICON CARBIDE (β-SIC) FOR COMBUSTION OF SOOT DERIVED FROM EXHAUST GASES FROM AN INTERNAL COMBUSTION ENGINE

CLAIM FOR PRIORITY

The present application claims priority under 35 U.S.C. §119 from French Patent Application No. 03 12085 filed on Oct. 16, 2003, and French Patent Application No. 04 07635 filed on Jul. 8, 2004, the contents of which are incorporated herein by reference in their entirety.

BACKGROUND OF THE INVENTION

1. Field of the Invention

This invention relates to catalytic filters comprising a silicon carbide ("SiC") foam and an active phase comprising at least one metallic element, processes for preparing the catalytic filters and methods for purification of exhaust gases from internal combustion engines, particularly diesel engines, using the catalytic filters.

2. Description of Related Art

In an ideal case, the exhaust gases from a hydrocarbon internal combustion engine will only contain carbon dioxide ("$CO_2$") and water ("$H_2O$"). In reality, the formation of other gases and solid products is observed. This is partly due to the presence of impurities contained in the hydrocarbons (such as sulphur compounds) and partly due to the complexity of the chemical reactions during combustion. For example, it is known that combustion in a diesel engine is non-homogenous and results in temperatures that are highly variable from one point of the fuel jet to another. The fuel jet may also be locally turbulent, which considerably complicates the analysis and forecasting of chemical reactions during the engine design. Therefore, during the combustion of hydrocarbons such as gasoline or gasoil in an internal combustion engine, there are firstly gas releases such as carbon monoxide ("CO"), nitrogen oxides (represented by the formula "$NO_x$" and containing mainly molecules such as nitrogen oxide ("NO") and nitrogen dioxide ("$NO_2$")), unburned hydrocarbons, $CO_2$, $H_2O$, together with the emission of variable sized solid particles.

Three different problems have been encountered with the attempted purification of exhaust gases from diesel engines. The first problem relates to the conversion of CO, a toxic and explosive gas, into $CO_2$. The second problem relates to the conversion of $NO_x$ derived from the reaction between nitrogen and oxygen contained in air and that have an irritating effect on the mucous membranes of the respiratory system, into nitrogen. The third problem relates to the formation of solid particles during combustion. In particular, solid particles formed during combustion may contain soot and condensed heavy hydrocarbons and mineral compounds such as sulphates present in the fuel. Their size varies as a function of the engine speed and the temperature in the combustion chamber; the smallest particles can penetrate deep into the lungs, bronchial tracts and alveoli, thus reducing lung capacity. Mutagenic and carcinogenic effects, particularly due to soot and condensed heavy hydrocarbon particles (such as aromatic polynuclide molecules) are known. Exhaust gases may also contain unburned fuel. Very small solid particles may also form in other types of internal combustion engines, and particularly other types of engines using liquid fuels. Thus, the destruction of emitted solid particles is a critical problem, particularly for diesel engines. It has been observed that the formation of solid particles during combustion is more specific to, but not limited to, diesel engines that use a heavier fuel and have an operating temperature lower than that of gasoline engines.

Several different approaches can be used to solve these problems. For example, a combustion speed can be found that will minimize the formation of undesirable waste releases. Further, this reduction at the source may be substituted or complemented by catalytic converters. However, catalytic converters used to minimize $NO_x$ in gasoline engines do not necessarily give good results for diesel engines since the oxygen content and the exhaust gas temperature of a diesel engine and a gasoline engine are different.

Additionally, filtration systems designed to retain particles in diesel engine exhaust gases can be used. For example, a system of filters using metallic or ceramic wires, for example in the form of a sponge coated with a catalytic deposit, is known. However, this system is fairly sensitive to vibrations that tend to wear the catalytic deposit; the catalytic deposit forms dust that is emitted with the exhaust.

Another known filtration system uses ceramic foam filters, typically based on extruded silicon carbide ("SiC") or extruded cordierite, comprising a fairly narrow distribution of large pores (diameter of the order of 100 μm to 500 μm) with few closed channels. These filters are characterized by good retention capacity before clogging and better crack resistance, but they suffer from a high pressure loss. They may be fabricated in the form of filter cartridges or filter inserts, but they are expensive.

Monolithic foam structure filters are also known for which a large porosity is used at the filter inlet with a smaller porosity at the outlet, the porosity possibly being varied continuously or discretely, on a single monolith with different porosity areas or by putting successive filters adjacent to each other each with a different porosity. For example, EP 0 050 340 (Bridgestone Tire Co. Ltd.), FR 2 498 471 (W.R. Grace & Co.), U.S. Pat. No. 4,912,076 (Swiss Aluminum Ltd.), and FR 2 650 628 (Aris s.a.) describe how to prepare particle filters from different filter elements made of ceramic material, each with a different porosity, such that the gases to be purified firstly pass through an area with large pores, and then through an area with smaller porosity. Additionally, U.S. Pat. No. 4,857,088 (Swiss Aluminum Ltd.) describes a particle filter with a more complex non-uniform type of porosity, but which is still based on the same principle of using a filter formed from filter elements made of ceramic material each with a different porosity. U.S. Pat. No. 5,053,062 (Donaldson Co.) proposes the use of a filter disk with large pores at the input to a filter cartridge, the filter disk having a high thermal emissivity such that the combustion of large carbon particles collected on this disk contributes to the increase in temperature of the filter cartridge.

One particular type of known filters with non-uniform porosities is honeycomb type filters in which the porous wall is covered on the outlet surface by a thin membrane with a finer porosity designed to facilitate filtration of very fine particles without significantly increasing the pressure loss. For example, U.S. Pat. No. 4,846,906 (The Durion Company) describes filters for diesel engine exhaust gases including a filter body based on ceramics with an open porosity, covered by a ceramic membrane with an open porosity with an average pore size smaller than the size of the filter body. Ceramics are prepared from an aluminosilicates gel. U.S. Pat. No. 4,871,495 (The Durion Company) describes a thermal process for preparing ceramics, particularly cordierite based ceramics, with a controlled pore size.

Additional honeycomb type filters are described in Patent Application WO 00/01463 (Silentor Notox) which teaches a filter for diesel engine exhaust gases composed of a filter element with a honeycomb structure, with a pore size of the order of 35-500 μm, and filter elements with a smaller pore size, 5-10 μm in an intermediate zone, and 0.5-5 μm in the outer zone that the gases pass through last. The application teaches that this type of filter element may be made of ceramic material based on SiC, prepared by extrusion of SiC powders, part of which must have a very fine grain size (of the order of 0.1-10 μm) so that it can act as a binder. The application further recommends use of an alumina wash-coat type coating.

A description of "diesel filter" state of the art is provided by P. Degobert in the article "*Pollution atmosphérique. Post-traitements* (Atmospheric pollution. Post-treatments)", published in May 1995 in the treatise "*Mécanique et Chaleur* (Mechanics and Heat)", volume BL1, booklet B 2 711 in the "*Techniques de l'Ingénieur* (Engineering techniques)" collection.

All the known systems involve the problem of regeneration. Particles captured in the filter block the pores, which increases the pressure loss. Therefore, the particles have to be removed by burning them either continuously or discontinuously. The temperature of exhaust gases from a diesel engine is too low for direct combustion of captured soot or hydrocarbon particles; their temperature is usually lower than 400° C., while spontaneous combustion of the particles takes place at a minimum temperature of about 400° C. to about 800° C. (depending on the particle composition). Therefore, a catalyst and/or heat have to be added to achieve permanent or periodic combustion of the captured particles. The addition of heat requires sophisticated temperature control, since materials used in currently available systems are poor conductors of heat. There are several regeneration systems, in series (with a single filter) or in parallel (with at least two filters) with or without added air, with addition of heat by electrical heating or by torch. However, these filter systems are complex and expensive, and require complex regulation systems.

For example, a filter system used on tourism vehicles uses very finely ground SiC based cartridges extruded as a honeycomb and sintered at a temperature of more than 1500° C. In these filters, typically one channel out of two is blocked which encourages the passage of gases through the ceramic pores rather than through the channel's system. Particles retained by the filter are periodically burned by adding a catalyst to the fuel. This system is efficient but expensive. Patent application EP 1 225 311 A2 (Th. J. Heimbach GmbH) describes a filter device made of an α-SiC "honeycomb" type ceramic.

The document by P. Degobert mentioned above describes another system consisting of a ceramic foam filter made from silicon carbide or cordierite with a fairly narrow distribution of large quasi-circular pores with a diameter of 250 to 500 μm, with a winding in-depth path, with few closed channels. These filters are made by impregnation of a polyurethane foam matrix by a cordierite paste that is then calcined. The result is thus a cordierite foam with about 20-30 pores per cm$^3$. These filters, made in the form of cartridges or filter inserts, have a retention ratio of the order of 60 to 70%.

Another known filter system is based on an extruded honeycombed cordierite cartridge impregnated with precious metals such as platinum.

European Patent 0 160 482 B1 (Engelhard Corporation) describes a filter composed of a cartridge made of ceramic material with porous walls impregnated with a catalyst composed of a mix of an element in the platinum group and an oxide of an element belonging to the alkaline earths. In this filter, the catalyst reduces the combustion temperature of soot particles, which are therefore continuously eliminated. The cartridge may be composed of cellular or monolithic ceramic material.

Patent application EP 1 142 619 A1 (Ibiden) describes a diesel filter system, in which the ceramic filter medium consists of a sintered porous SiC with an average pore diameter of about 5 to 15 μm, in which at least 20% of the pores are open. This filter medium is made from a mix of α-SiC and β-SiC powders prepared with an organic binder, or from silicon nitride, sialon, alumina, cordierite or mullite. Several of these ceramic blocks are assembled using a ceramic fiber paste based on aluminium silicate. This avoids the need to use relatively large blocks, since the probability of cracks forming in the ceramic material increases with the block size.

French patent application 2 818 163 (Renault) describes a new copper based catalyst in which soot particles can be burned at normal exhaust gas temperatures, namely about 300° C. This catalyst may be applied on known ceramic supports, particularly oxide type supports such as cordierite, or on metallic filters.

Patent application WO 93/13303 (Stobbe) describes a filter system made of α-SiC sintered at 2200-2600° C. composed of segments that can be heated individually or in groups, by the Joule effect, in order to burn soot particles. The electrical resistance of this product is fairly high, and a high current is necessary to heat it.

Patent application JP 07-080226 (Ibiden) proposes to reduce the electrical resistance of SiC ceramics by adding additives.

The article "An optimal $NO_x$ assisted abatement of diesel soot in an advanced catalytic filter design" by A. Setiabudi, M. Makkee and J. A. Moulijn, published in the Applied Catalysis B review: Environmental, vol 42, P. 35-45 (2003) describes a catalyst prepared by impregnation of a 20 ppi SiC foam with a solution of Pt $(NH_3)_4$ $Cl_2H_2O$, leading to a Pt content of 1.5%.

Different methods of making SiC are known. For example, patent EP 313 480 B1 (Pechiney Electrométallurgie) describes a process for production of fine silicon carbide grains consisting of generating SiO vapors in a first reaction area by heating a mix of $SiO_2$+Si to a temperature ranging from 1100 to 1400° C. at a pressure ranging from 0.1 to 1.5 hPa, and then bringing these SiO vapors into contact with reactive carbon with a specific surface area equal to at least 200 m$^2$/g at a temperature ranging from 1100 to 1400° C. A variant of this process is described in patent EP 543 752 B1 (Pechiney Recherche). The process described in this patent consists of preparing a carbon foam by pyrolysis of a polyurethane foam impregnated with a thermosetting resin at a temperature ranging from 700 to 900° C., activating the foam by a $CO_2$ draft at 700-1000° C., and then exposing this foam to an SiO vapour to form an SiC foam.

Patent EP 440 569 B1 (Pechiney Recherche) describes a process for obtaining SiC consisting of mixing furfurylic resin with an organic hardener and silicon powder, hardening this mix in a drying oven at about 100 to 120° C., carbonizing this hardened mix by heating it to a temperature of the order of 900° C. under a nitrogen draft, and then carbiding this intermediate prouct by heating it to a temperature of the order of 1200° C. under an argon draft, possibly followed by elimination of excess carbon at a temperature of about 600° C. under air. Patent EP 511 919 B1 (Pechiney Recherche) describes the preparation of catalysts starting from this product.

Patent EP 624 560 B1 (Pechiney Recherche) describes a process for obtaining SiC consisting of impregnating a polyurethane foam with a suspension of silicon powder in an organic resin with a controlled mass ratio, polymerising the resin, carbonising the organic polymers and then carbiding the silicon. According to the information in this patent, it is preferred to use a specific surface area BET less than 5 m$^2$/g and a very low mesoporosity for the filtration of diesel engine exhaust gases.

SiC based foams with different pore sizes, for example macropores and micropores, are also known. This type of foam, prepared using different processes, is disclosed in patents FR 2 766 389 (Pechiney Recherche) that describes a foam with a porosity with dual mode distribution, and in patent FR 2 705 340 (Pechiney Recherche).

In any case, in the current state of the art, the use of a Diesel filter introduces a non-negligible extra cost and consequently only a few vehicle models are equipped with a Diesel filter.

In view of the problems related to clogging, resistance to vibrations and temperature cycles, regeneration, regulation and cost of filters according to the state of the art, active research is being done to find simpler, more robust and less expensive filter devices. This type of device would have to use a filter medium that is easy to make in different geometric shapes, and that does not crack during manufacturing or manipulation.

SUMMARY OF THE INVENTION

Thus, there is a need for catalytic particle filters for purification of exhaust gases produced by internal combustion engines, that are easier to make, more robust and less expensive than known filters, that retain as many particles as possible and particularly small particles, that have a low pressure loss and are suitable for continuous regeneration.

In accordance with these and other objects, in one aspect, the present invention is directed to a β-SiC foam part with a specific surface area equal to at least 5 m$^2$/g and with at least two zones A and B with a different porosity distribution, characterized in that the part is made by chemical transformation of a porous precursor medium composed of at least two blocks A' and B' with a different porosity distribution, and in that the at least two zones A and B are derived from the said chemical transformation of the said at least two blocks A' and B'.

In yet further accordance with the present invention, there are two manufacturing processes used to make such a β-SiC foam part with a specific surface area equal to at least 5 m$^2$/g and with at least two zones A and B with a different porosity distribution.

The first step in these two processes (A) and (B) is to prepare a precursor medium made of a carbonizable foam with an open cellular structure (such as a polyurethane foam) comprising at least two zones with a different porosity distribution, that is impregnated with a hardening resin, and preferably a thermosetting resin, that in process (B) is in the form of a silicon powder suspension in a hardening resin, and preferably a thermosetting resin. The resin is then crosslinked, in the case of thermosetting resins by gradually increasing the temperature. The remainder of the process is then different for processes (A) and (B).

The next step in process (A) is to pyrolyze the foam to form a carbon foam, activate the carbon foam by heating it while under a CO$_2$ draft to a temperature ranging from 700° C. to 1000° C., and exposing the activated carbon foam to an SiO vapour to form a silicon carbide foam.

In process (B), the carbonizable foam with an open cellular structure and the resin are carbonized, and the carbon thus formed is silicided by progressively increasing the temperature up to a temperature not exceeding 1600° C.

In both processes (A) and (B), the residual carbon can be eliminated by oxidation of the product at a temperature ranging from 650° C. to 950° C.

Another embodiment of the invention is a device for a catalytic filter cartridge comprising a filter medium made of an β-SiC foam with a specific surface area equal to at least 5 m$^2$/g and at least one active phase, the cartridge being surrounded by a solid wall made of a material impermeable to gases and equipped with at least two openings, including one for the inlet of gases to be filtered and the other for the outlet of gases from which at least some of their solid particles have been eliminated, the cartridge being characterized in that the filter medium comprises at least two zones with a different porosity.

Additional objects, features and advantages of the invention will be set forth in the description which follows, and in part, will be obvious from the description, or may be learned by practice of the invention. The objects, features and advantages of the invention may be realized and obtained by means of the instrumentalities and combinations particularly pointed out in the appended claims.

These curves show the efficiency of the catalytic filter device in combustion of a model soot.

Figure 3A:
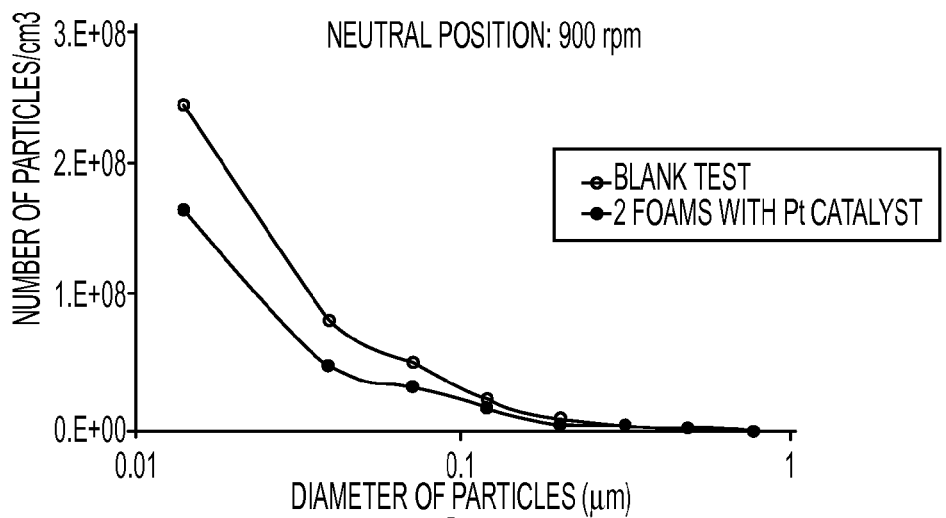
Figure 3B:
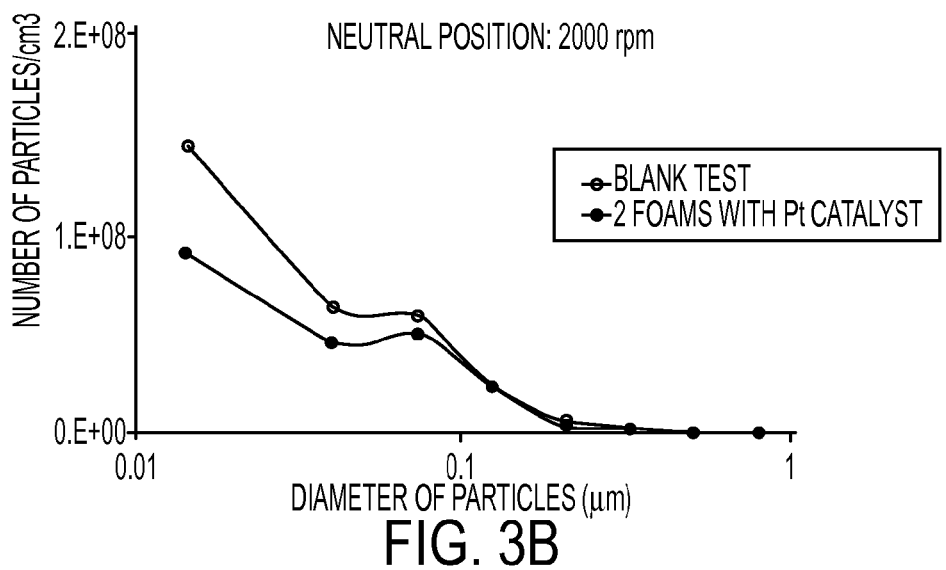
Figure 3C:
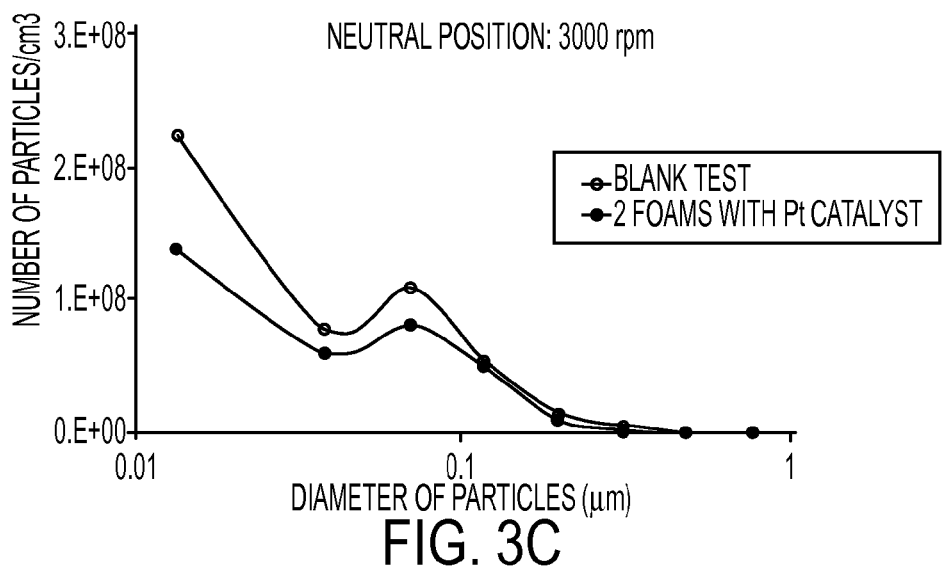

FIG. 3 shows the distribution of the size of particles contained in the exhaust gases from a tourism vehicle equipped with a diesel engine (test on roller bench for 900, 2000 and 3000 rpm). FIG. 3 corresponds to example 3.

Figure 4:
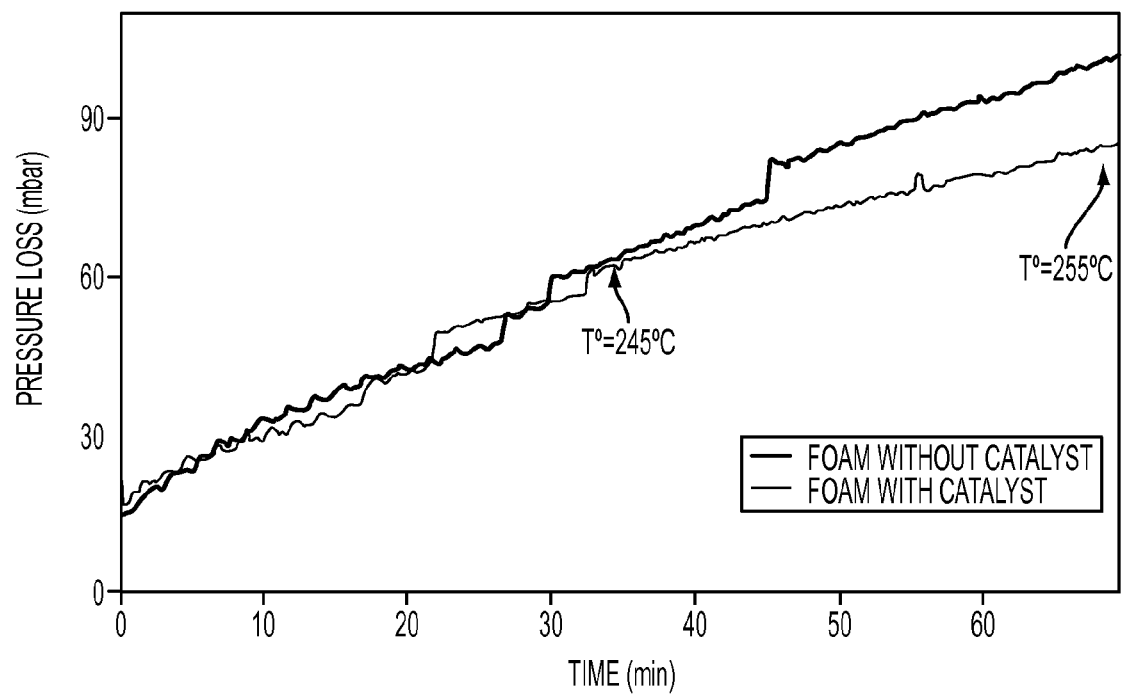

FIG. 4 corresponds to example 4, and shows the variation of the pressure loss as a function of time for catalyzed foams (a) and non-catalyzed foams (b).

Figure 5:
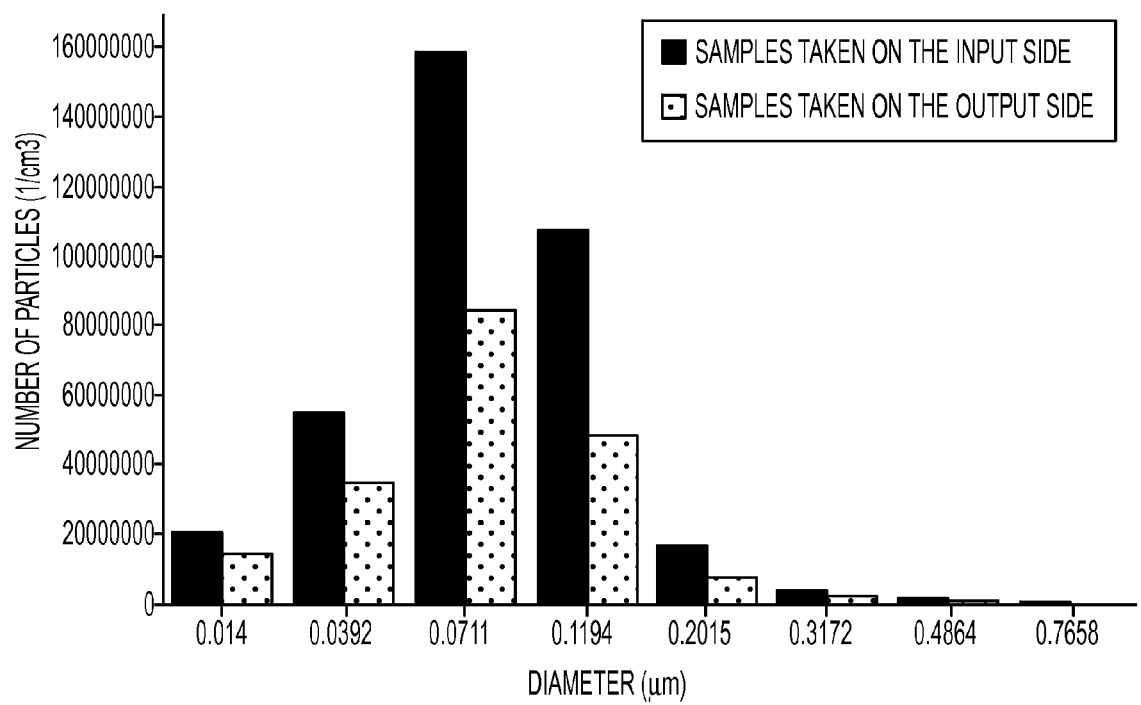

FIG. 5 corresponds to example 4, and shows the distribution as a number of particles emitted for samples taken on the input side (a) and the output side (b) of the catalytic system.

Figure 6:
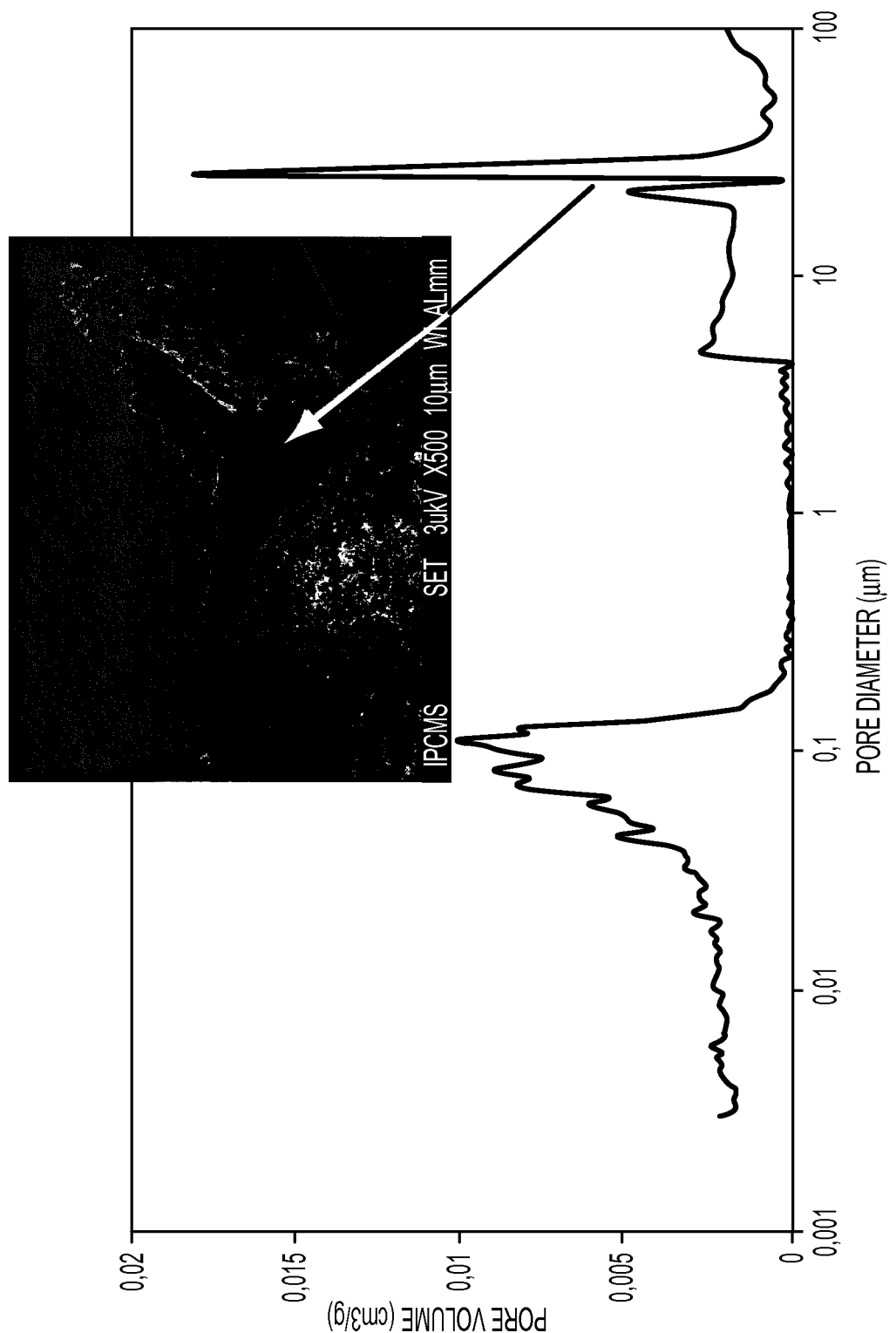

FIG. 6 shows the distribution of the porosity of a typical β-SiC foam, with micrography of the section of a cellular bridge (magnification defined by the bar indicating a length of 10 μm).

DETAILED DESCRIPTION OF PREFERRED EMBODIMENTS

The applicants have found that certain disadvantages according to the prior art can be overcome by using a catalytic filter device having a filter medium comprising at least one β-SiC foam part wherein the pore size is adjusted such that the gas to be purified passes through at least two zones with a different porosity distribution. The filter medium further comprises an active phase, preferably composed of an element from the platinum group alone, an alloy or a mix with another element.

a) Definitions

As used herein, a "filter medium" is a medium through which exhaust gases pass; the medium retains at least a proportion of the particles contained in the exhaust gases.

The porosity of a material is usually defined with reference to three pore categories, distinguished by their size—microporosity (diameter less than about 2 nm), mesoporosity (diameter ranging from about 2 to about 50 nm), and macroporosity (diameter more than about 50 nm).

As used herein, "porosity distribution" refers to the pore size distribution curve per unit volume of the filter medium or part of the filter medium. This distribution may be represented as a good approximation by an average value and a standard deviation, if it is approximately Gaussian. In other cases, for example as in the case of a dual mode distribution, several parameters have to be used to correctly describe the porosity distribution. In one aspect of the invention, β-SiC foam parts have a complex distribution characterized by the presence of open cells and a meso- and macroporosity, the microporosity being not significant in the context of this invention. The diameter of the "open cells" preferably is equal to at least about 200 μm.

As used herein, "zones with different porosity distribution" means at least two reference zones for the filter medium or part of the filter medium in which the porosity distribution as defined above is statistically significantly different. For example, the filter medium may comprise a porosity gradient; in this case, the two reference zones may be located at the ends of the gradient. A reference zone should be significantly larger than the largest porosity contained within this zone. For example, a factor of five may be suitable. The filter medium may also include a discontinuity, in other words it may be composed of two or several blocks with a different porosity distribution; in this case, each block may form a "zone".

As used herein, a "cartridge" is a catalytic filter device comprising a filter medium composed of a support and an active phase, surrounded by a solid housing made of a material impermeable to gases (that may be in the form of an "enclosure", in other words a hollow receptacle with an impermeable wall, except at the locations intended to be open) and resisting to the working temperature of the device. This cartridge is equipped with at least two openings, one for the inlet of exhaust gases, the other for outlet of exhaust gases from which at least some of the solid particles from the exhaust gases have been removed. According to the invention, a cartridge may contain one or several solid parts of a catalytic filter medium. If the cartridge contains several of these solid parts forming the catalytic part of the device, these solid parts are called "blocks", regardless of their geometric shape. If the cartridge only contains a single solid part of the filter medium, this part is called an "filter insert"; that is, a solid part of the filter medium, with a shape ready to be inserted in the cartridge.

As used herein, a "precursor medium" means a part or an assembly of parts of a precursor material of the filter medium, which is then transformed by one or several chemical reactions at high temperature into a part forming all or some of a catalytic filter medium.

b) Manufacturing of SiC Foam

The SiC foam used for this invention should be β-SiC foam having a BET specific surface area equal to at least 5 m²/g, preferably at least 7 m²/g and even more preferably at least 10 m²/g. Additionally, the SiC foam preferably has a suitably adjusted porosity as described in section [0045] of patent EP 0 624 560 B1, which is incorporated herein by reference in its entirety.

In some embodiments of present invention, it is preferred to use a β-SiC foam which is in the form of a cellular foam with open porosity. For the purposes of this description, a "cellular foam" means a foam that firstly has a very low density and secondly a very large porous volume. In one aspect of the invention, the β-SiC cellular foam preferably has a density ranging from 0.05 g/cm³ to 0.5 g/cm³, more preferably from 0.1 to 0.2 g/cm³. Therefore a 1 cm long cube made of a cellular foam having a density ranging from 0.05 g/cm³ to 0.5 g/cm³ will weigh between 0.05 and 0.5 g. If the density is less than about 0.05 g/cm³, problems can arise with the mechanical strength of the foam. If the density is more than 0.5 g/cm³, the cellular porous volume will be smaller and the pressure loss will increase without providing any functional advantage.

For example, a SiC cellular foam can be prepared composed of a three-dimensional structure of cages ("cells") interconnected by cellular bridges, the cages being treated like dodecahedrons composed of an arrangement of 12 pentagonal windows. This structure shows two opening sizes through which gases pass through the part:
1. openings composed of unit pentagons,
2. larger openings, that can be treated like circles and formed by the larger diameter of the dodecahedron.

Figure 1:
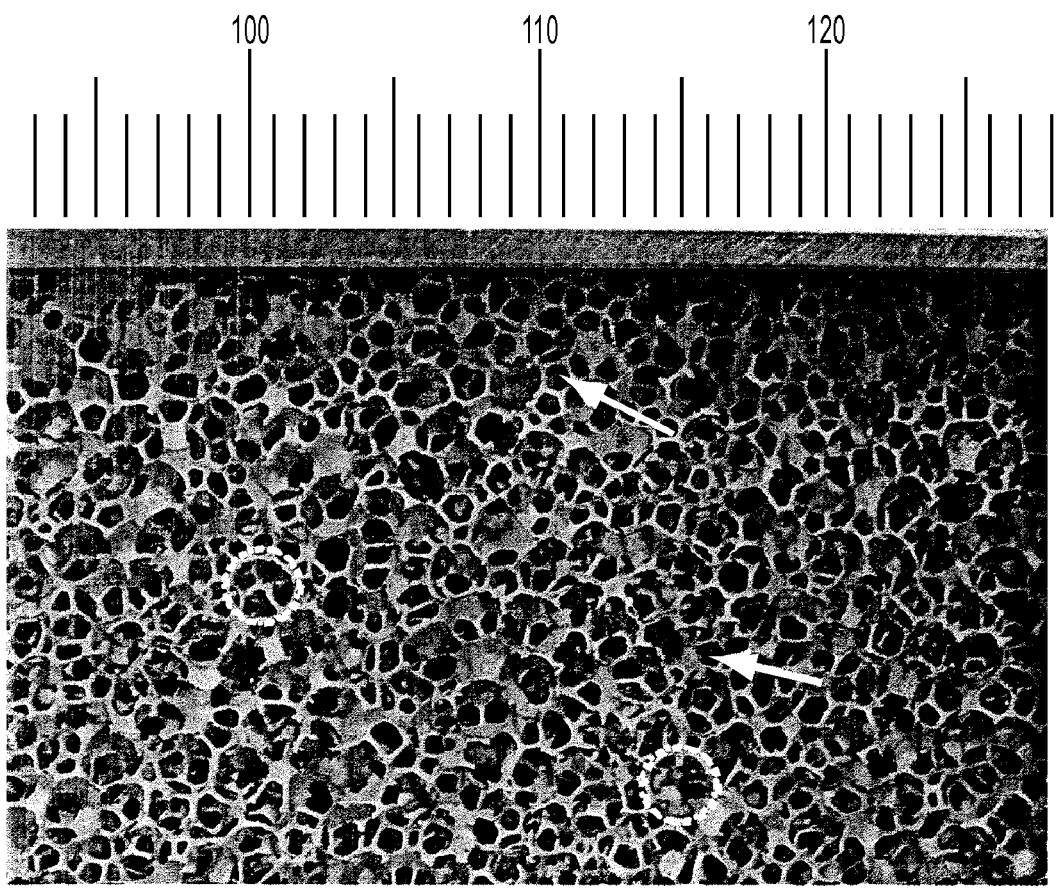
FIG. 1 shows a photograph of the foam with characteristic size of 2150 μm. The rule is calibrated in millimeters. The arrows show unit pentagons. The circles surround polygons used to determine the size of foam pores.

The average size of the largest openings is measured optically and is used to characterize the size of foam cells; it is the magnitude used to define the characteristic size of the pores of a filter medium. This parameter largely determines the pressure loss in a filter medium according to the invention. For example, a foam with a characteristic size of 2150 μm is shown in FIG. 1. FIG. 6 shows the micrography of the section of a cellular bridge. This bridge is hollow; the porosity (measured by mercury intrusion) corresponding to this dimension is of the order of 30 to 40 μm. FIG. 6 also shows the presence of a mesoporosity of the order of 10 to 100 nm. It does not show cellular porosity. The total porosity of such a typical foam made of SiC is of the order of about 95%. This means that about 95% of the macroscopic volume of a SiC foam part is occupied by pores, including about 90% due to cellular porosity and about 5% due to the intrinsic porosity of cellular bridges (with its dual mode distribution as shown in FIG. 6).

The opening of the foam pores may also be modified by modifying the size of the cells in the carbonizable foam with an initially open cellular structure. SiC foams with an average pore size ranging from 500 μm to 4000 μm preferably are used for each zone. More preferably, the average pore size is ranging from 900 μm to 1000 μm and 3000 μm, and most preferably from 900 μm to 1800 μm. With a pore size less than 500 μm (about 80 pores per inch (ppi)), the pressure loss in the resulting filter medium would be excessive. In practice, it is preferred not to drop below 800 μm. With a pore size more than 4000 μm (about 12 ppi), the resulting filter medium does not have sufficient retention efficiency. Limiting factors to be considered in the design of a filter medium according to the invention include (1) a global pressure loss for systems in which an attempt is made to increase the efficiency by reducing the average pore size; and (2) to increase the global efficiency for systems in which an attempt is made to reduce the global pressure loss by increasing the pore size. Advantageously, the filter medium may be composed of a cellular foam with zones with a different porosity distribution, formed either by providing a sequence of foams with different pore sizes, or by a single part with a porosity gradient, or by a combination of the two. For each zone, the average porosity preferably is within the ranges mentioned above. In one advantageous embodiment of the invention, the standard deviation of the size distribution of cells in a given zone does not exceed 10%.

The size of pores forming the SiC foam may vary over a relatively wide range. Preferably, the size of the pores are such that pressure loss is minimized and the catalytic combustion capacity of the system is maximized.

As mentioned above, apart from the macroscopic porosity provided by the cellular structure that enables easy circulation of gas through the filter, the β-SiC foam according to the invention also has a mesoporous porosity with a size typically ranging from 10 to 100 nm. Due to this additional porosity, the foam according to the invention develops a large specific surface area equal to at least about 5 m²/g, and up to about 25 m²/g which gives the foam very good catalytic phase dispersion properties. Thus, unlike known filter media based on an α-SiC material, there is no need to take measures to increase the specific surface area of the filter medium, for example by depositing a wash-coat type of solid phase with a high specific surface area.

A specific surface area ranging from about 10 m²/g to about 20 m²/g is preferred for the purposes of this invention.

In another embodiment of the invention, the β-SiC foam may be made by one of the following processes:

(A) First Process:

A first process for preparing a SiC foam includes the following steps:
 (Aa) preparing a precursor medium comprising a carbonizable foam having an open cellular porosity with a predefined porous distribution, that is impregnated with a hardening resin, and preferably a thermosetting resin;
 (Ab) cross-linking the resin, for example, in the case of thermosetting resins, by gradually increasing the temperature followed by a constant temperature that can last from a few tens of minutes to a few days;
 (Ac) pyrolyzing the foam to form a carbon foam;
 (Ad) activating the carbon foam, preferably by heating it under a $CO_2$ draft at a temperature ranging from 700° C. to 1000° C.; and
 (Ae) exposing the activated carbon foam to an SiO vapour to form the SiC foam.

In one preferred embodiment, step (Ae) is carried out at a temperature ranging from 1200° C. to 1400° C. at atmospheric pressure. Additionally, residual carbon can be eliminated by oxidation of the product at a temperature typically ranging from 650° C. to 950° C.

(B) Second Process:

A second process for preparing a SiC foam includes the following steps:
 (Ba) preparing a precursor medium is prepared comprising a carbonizable foam having an open cellular porosity with a predefined porous distribution, that is impregnated with a hardening resin having a silicon powder suspension therein, and preferably a thermosetting resin;
 (Bb) cross-linking the resin, for example, in the case of thermosetting resins by gradually increasing the temperature followed by a constant temperature that can last from a few tens of minutes to a few days;
 (Bc) simultaneously (1) carbonizing the carbonizable foam with an open cellular porosity and the resin containing silicon, and (2) siliciding the carbon by gradually increasing the temperature up to not more than 1600° C., preferably ranging from 1200° C. to 1400° C.; and
 (Bd) eliminating residual carbon by oxidation of the product at a temperature ranging typically from 650° C. to 950° C.

In steps (Aa) and (Ba), the thermosetting resin preferably is chosen from among furfurylic and phenolic resins, or mixtures thereof. A photocurable resin can be used, too.

In step (Bc), the temperature most preferably does not exceed 1400° C., as a loss of specific surface area has sometimes been observed when a temperature of the order of 1400° C. is exceeded.

These two processes may be used with variants. For example, in one very advantageous variant of process (A), step (Aa) is replaced by the following step (Aaa):
 (Aaa) preparing a precursor medium comprising a carbonizable foam with an open cellular porosity, such as, for example, a polyurethane foam, comprising at least two zones with a different porosity distribution, that is impregnated with a hardening resin, and preferably a thermosetting resin;
 and then the process is continued with steps (Ab), (Ac), (Ad) and (Ae) set forth above Similarly, in one advantageous variant of process (B), step (Ba) is replaced by step (Baa):
 (Baa) preparing a precursor medium comprising a carbonizable foam with an open cellular porosity comprising at least two zones with a different porosity distribution, that is impregnated with a carbonated hardening resin having a silicon powder suspension therein, and preferably a thermosetting resin;
 and then the process is continued with steps (Bb), (Bc) and (Bd) set forth above.

Preferably the second process (B) is used to for preparing a SiC foam, since one advantage of process (B) is that it is industrially simpler.

The hardening resin used in steps (Aa), (Aaa), (Ba) and (Baa) preferably is a furfurylic, phenolic or polyurethane resin, or a mixture thereof. Photocurable resins can be used, too.

One of the advantages of the processes according to the invention and all their variants, is the ease with which filter medium can be made into a required geometric shape. Advantageously, the part made of a carbonizable foam is made into the desired shape for use as a catalytic filter medium after cross-linking (i.e., steps (Ab) and (Bb)), or the carbon foam is machined.

The silicon carbide foam used in the present invention should be β-SiC, which crystallizes in a cubic system with centered faces. The high thermal conductivity of such a β-SiC foam provides for improved heat transfer in order to limit hot points and to quickly reach a thermal equilibrium. Due to its high thermal conductivity, it can easily be heated by bringing it into contact with one or several external heating means. The heating means could be a heater band that at least partially surrounds the foam, or a heating rod (for example a thermoplunger) that is inserted into a housing provided for it in the foam.

Furthermore, the β-SiC foam can sometimes have a sufficiently high electrical conductivity so that it can be heated directly by passing an electrical current. This intrinsic heating means can replace the external heating means, or it can be added to it. It has been observed that β-SiC based foam has an excellent compromise between efficiency of elimination of soot particles and weight, which is not the case for other existing commercially available onboard systems.

Another advantage of this invention is the possibility of making different shaped parts to adapt to the available space on the exhaust line. Blocks catalyzed in this way can also be used in series and can be heated independently.

The carbonizable foam may be chosen from polyurethane foam or other organic polymer foams with some mechanical flexibility, without some metallic elements derived from polymerisation catalysts used for its production. A carbonizable foam with a compressible open cellular structure is preferred, since this enables more efficient impregnation by an impregnation process followed by centrifuging. Most preferably, the carbonizable foam is polyurethane foam.

Preferably, the polyurethane foam will have a calibrated cell size without a significant fraction of closed cells, and will preferably be a foam with a completely open cellular network. This type of foam is commercially available. Methods of manufacturing the filter medium according to this invention are referred to as "shape memory syntheses" to the extent that the porosity of the carbonizable foam has a direct influence on the porosity of the β-SiC foam obtained. For example, the polyurethane foam may be based on polyester or polyether. The inventors have observed that a more open porosity is obtained with a polyester based polyurethane foam.

In one preferred embodiment of the invention, the carbonizable foam is a polyurethane foam with a variable cellular pore opening size. This variation of the porous distribution may be in the form of a gradient (variant (i)). The carbonizable foam may also be composed of several blocks with different pore openings, for example a pore opening that is larger at the device inlet and a pore opening that is smaller at the outlet from the same device (variant (ii)). This type of precursor medium can be used to make a discontinuous filter device. These two variants (i) and (ii) may also be combined.

In one preferred embodiment of the invention, the SiC foam is impregnated with a chemical substance(s) that acts as a catalyst or that is a precursor of such agents (referred to herein as an "active agent"), particularly as oxidation catalyst to catalyze the combustion of soot particles passing through the device. The oxidant source is either oxygen or NO or $NO_x$ contained in the exhaust gases to be purified.

For example, according to known techniques, β-SiC foam can be impregnated with a solution containing one or several compounds to form a catalytically active phase. The compounds preferably are selected from the group consisting of platinum, rhodium, palladium or linear combinations or alloys of the metals. The presence of at least one of these metals lowers the soot combustion temperature and enables continuous combustion, thus preventing the accumulation of dirt in the device. Nevertheless, the use of an external heating means is one preferred embodiment of the invention for diesel engines. The large specific surface area of β-SiC means that a catalytically active phase can be deposited directly on its surface without the need for an additional wash-coat. (A wash-coat is an additional coat, typically made of alumina and/or cerine, with a high specific surface area that will compensate for the lack of a sufficiently high specific surface area of the catalyst support). This results in a non-negligible saving in the manufacturing cost. The concentration of the active agent advantageously ranges from 0.1% to 2% by mass of the support. In one particular embodiment, the concentration ranges from 0.2% to 1.5%, and preferably from 0.2% to 0.5%, so that the cost of the precious metal can be limited.

c) Catalytic Filtration Devices

In one preferred embodiment of the invention, the porosity of the filter medium zone through which the exhaust gases pass first to be filtered is larger than the porosity in the zone that it passes through later.

For example, the said gradient may be parallel to the longitudinal direction of the filter medium (longitudinal gradient) or it may be perpendicular to the longitudinal direction of the filter medium (axial gradient), the shape of the said filter medium often being cylindrical so that it can be inserted into a receptacle such as a metallic tube. Furthermore, the porosity gradient, as a function of the location in the filter medium, may cause a continuous or discontinuous variation of the porosity distribution. As will be explained in more detail below, three types of variations of the porosity distribution can be obtained within the context of this invention: a) a gradient inside a continuous filter medium, b) a gradient within a continuous filter medium achieved by the assembly of at least two precursor media, and c) a variation within a discontinuous filter medium composed of at least two mechanically assembled blocks of filter medium. These three types of filter media, in this case characterized by the shape of the variation of their porosity distribution, correspond to different embodiments of this invention. They may be made with an axial gradient or a longitudinal gradient.

In one advantageous embodiment of this invention, the pore size of the filter medium varies with a gradient. This gradient may be parallel to the longitudinal direction of the cartridge or perpendicular to the longitudinal direction of the said cartridge. It is important that this gradient, and possibly the assembly of blocks, should be chosen such that the exhaust gas flow starts by passing through a region with large pore sizes, and then passes through a region with smaller pore sizes. For example, a filter insert with a porosity gradient can be made, or the filter medium can be assembled from at least two blocks with a different porosity.

It has been found that, within the context of this invention, it is possible to obtain a SiC foam with variable porosity, and even with a controlled porosity gradient, starting from a polyurethane foam that also has a controlled porosity or a porosity gradient. This type of polyurethane foam with controlled porosity may for example be made from an expansion agent, and preferably a reactive expansion agent.

In another embodiment of the invention, a continuous filter medium is made by assembly of at least two parts of polyurethane foam (precursor media) with different porosities, that are then subjected to high temperature chemical reactions to make a SiC foam block with zones with the required porosity size.

For the same purpose, the filter medium can also be assembled from SiC foam blocks with a different porosity; in this case, there is a discontinuous filter medium. The SiC foam used for the purpose of this invention, and the precursor media of the SiC foam, can easily be shaped, for example by sawing, machining, drilling or cutting, so that their shape can easily be controlled so that it fills the entire required volume of the cartridge. Cutting, sawing, machining or drilling may advantageously be done on foam dipped in cold water and frozen. This ease of shaping is a significant advantage compared with filter media usually used in particle filter devices for the purification of exhaust gases from internal combustion engines.

The filter insert as used in the inventions may have a more compact SiC skin, as described in U.S. Pat. No. 5,958,831, to improve the compression strength of the filter insert. A more compact and denser SiC skin can be obtained much more easily by applying stress to the precursor medium after surface impregnation, for example by inserting it into a slightly smaller mould and hardening it under stress.

A filter insert with a concentric gradient (i.e., a gradient perpendicular to the longitudinal direction) can also be prepared from a polyurethane foam part formed by winding sheets made of polyurethane foam.

In one advantageous embodiment, a filter insert is made comprising three zones with a different porosity: the first has a pore opening ranging from about 1500 to about 1900 μm, the second has a pore opening ranging from about 1000 to about 1400 μm, and the third a pore opening ranging from about 850 to about 975 μm. The active phase may be made of platinum.

In another advantageous embodiment, a filter insert comprising two foams is made, a first foam with a large cell size with a platinum active phase with a fairly high concentration (e.g., close to about 2%) followed by a second foam with a smaller cell size and a lower platinum content. In such a device, the first catalytic filter stage transforms NO into $NO_2$ but does not retain a significant quantity of soot, while the second catalytic filter stage retains soot that is burned by $NO_2$.

In yet another advantageous embodiment, the foam in the second phase contains Pt+Rh (for example in the proportion 2/3:1/3).

d) Using the Device

As mentioned above, the SiC foam used in the context of this invention preferably is composed of β-SiC. The applicant has observed that such a foam has a sufficiently high thermal conductivity so that it can easily be heated by bringing it into contact with one or several external heating means. The heating means used may be a heater band that at least partially surrounds a cartridge, or a heating rod (thermo-plunger) that is inserted into a housing provided for it in the cartridge. Another external heating means that could be used for this invention is microwave heating. Thus, particles retained by the filter could be burned periodically or continuously.

In one preferred embodiment of the invention, the SiC foam is impregnated with chemical substances that act as a catalyst, particularly as an oxidation catalyst to catalyse combustion of retained particles. For example, according to known techniques, the SiC foam can be impregnated with an active phase containing at least one of the elements platinum, rhodium or palladium. This type of impregnated cartridge can regenerate itself even without the use of any heating means, if the temperature of the exhaust gases that pass through it is sufficiently high. One advantageous equilibrium temperature is about 300° C. However, the use of a heating means is one preferred embodiment of the invention for diesel engines.

The filter device according to the invention may be mounted on any type of internal combustion engine, and particularly on any engine using liquid fuels. One advantageous use of the said device is use as an exhaust gas filter for a diesel engine. The device may comprise one, two, three or even more channels, each of which is provided with a cartridge. In one embodiment, the cartridges of one of these channels may be in regeneration mode, in other words air is forced into the hot cartridge to burn the particles, while at least one other cartridge filters the exhaust gases.

In another embodiment, filtered particles are burned continuously during filtration, either using a filter medium made of β-SiC foam impregnated with an appropriate catalyst, or by periodic or continuous injection of a catalyst or catalyst precursor into the fuel. However, one major advantage of the device according to the invention is that the catalytic filter regenerates itself almost continuously to make it possible to operate in continuous mode at a relatively low temperature not normally exceeding 500° C. or even 400° C., which avoids the unacceptable increase in the pressure loss on the exhaust line. Advantageously, the temperature is ranging from 200° C. to 500° C., and preferably from 220° C. to 400° C., and even more preferably is from 240° C. to 380° C. Thus, it is possible to use a device with a single channel, which simplifies the device and means that there is no need to manage discontinuous phenomena (such as injection of catalyst into the fuel). It may also be useful to heat the device when it is cold, particularly when the engine is being started, which can be done very simply in the device according to the invention, for example by microwaves or the Joule effect. The good thermal conductivity of β-SiC helps to set up a thermal equilibrium quickly when the temperature changes.

e) Advantages of the Invention

The use of a β-SiC foam in the invention has the following advantages:

First, the manufacturing of shaped parts made of β-SiC foam (filter inserts or blocks) uses inexpensive raw materials. There is no need to extrude a honeycomb part. SiC foam parts obtained, and their precursors, can be machined. It is easy to make different shaped parts to adapt to the available space on the exhaust line. The thermal conductivity of the β-SiC obtained is good and avoids the formation of hot points; it facilitates heating.

Another advantage of the invention is that the active phase may be deposited directly on the β-SiC without the need for an additional wash-coat, which introduces another saving manufacturing cost and facilitates recycling of the active phase. The β-SiC foam used for the purpose of this invention has a sufficiently large specific surface area (at least 5 $m^2/g$, preferably at least 7 $m^2/g$ and even more preferably at least 10 $m^2/g$) so that it can be used as a support for a catalyst, while the specific surface area in known α-SiC devices is too small and must be increased by the deposition of a wash-coat containing alumina powder.

Yet another advantage of using β-SiC foam in the invention is the low cost of manufacturing a β-SiC foam, which in particular is less than the cost of a α-SiC monolith according to the state of the art, due to a significantly lower synthesis temperature (about 1100° C. in the process according to the invention, compared with about 1700-2300° C. for known processes).

The use of a cellular foam with an open porosity also has the following advantages: the pressure loss varies little when the filter is dirty; the porous structure can be optimized to maximize the filtration efficiency/pressure loss ratio by using a well controlled variable porosity between the inlet and outlet of the filter.

The device according to the invention has many technical and economic advantages compared with the devices according to prior art, and particularly compared with existing devices with a ceramic cartridge. When β-SiC foam parts have a surface skin, they can easily be manipulated, they are resistant to hostile operating conditions such as vibrations, thermal shocks, mechanical shocks, that occur during their use, particularly in private and industrial vehicles, building and agricultural machinery, locomotives and ships.

The device according to this invention has a very long life. SiC foam blocks can easily be recycled; the metallic catalyst is recovered by washing with an appropriate acid, and the remaining SiC foam can be ground; the powder thus obtained can be used in some industrial ceramic applications known to those skilled in the art.

The filter device according to the invention can be installed on all types of internal combustion engines, particularly on any engine using liquid fuel, and more specifically on Diesel type engines.

The following examples illustrate different embodiments of the invention and demonstrate their advantages. They are in no way considered to restrict the invention.

EXAMPLES

Example 1

Preparation Process for an Active Catalyst Phase for Deposition on a β-Sic Foam

This example illustrates details of the preparation of a catalyst capable of burning soot output from a diesel engine.

A homogeneous mix was prepared composed of a suspension of 810 g of silicon powder in 1000 g of phenolic resin. A polyurethane foam based on polyester with an average porosity of 1200 μm was impregnated with this mix, with a quantity equal to about 20 times its own mass. The part obtained was then hardened by a treatment under air at 150° C. for 3 hours, and was then treated at 1360° C. for 1 hour under an argon flow in order to form a β-SiC phase. Finally, the residual carbon was eliminated by heating the foam under air at 700° C. for 3 hours.

The part thus obtained has an average cellular porosity (macroscopic) of about 1500 μm, which was about 25% more than the size in the initial foam. This cellular porosity was complemented by an additional porosity ranging from 10 to 100 mm, representing a mesoporous volume of 0.2 ml/g and a specific surface area of 10 $m^2/g$.

A catalyst based on platinum with a Pt content of 0.5% by mass of the SiC (β-SiC) foam support, was made starting from a portion of this part. The porous volume was impregnated, using the technique known to those skilled in the art. A portion with dimensions 1.5 cm thick and 5 cm diameter and weighing 7.53 g, was cut out of the β-SiC foam with a pore opening of 1500 μm. Impregnation consists of dissolving 0.0645 g of precursor salt containing the active phase, $(NH_3)_4Pt(Cl)_2.H_2O$, in 15 mL of distilled water. The first step was to wet the support by pouring half of the precursor salt solution drop by drop, in other words 7 mL, on the face side of the foam. This final operation stopped when the support was saturated. The foam was then dried in ambient air for 12 hours. In a second step, the foam was turned over and the rest of the precursor salt solution was applied drop by drop on the back side of the foam. The foam was then dried at ambient temperature.

After oven drying at 100° C. for 12 hours, the solid was then calcined under air at 400° C. for 2 hours, in order to decompose the precursor salt. No reduction under hydrogen was done. The catalyst was then ready. It was used to perform catalytic combustion of soot at a temperature less than 500° C. in continuous mode.

Example 2

Use of a Catalyst Prepared According to Example 1 in a Soot Combustion Model Study This example describes results obtained during combustion of a model soot on a catalytic filter composed of a β-SiC foam with a pore opening of 3600 μm and an active phase containing 0.5% by mass of platinum. The catalytic filter was cylindrical in shape and its dimensions were 30 mm diameter and 20 mm long. Its mass is 1.44 g. Its specific surface area was on the order of 10 $m^2/g$.

After impregnation and heat treatment (as described in Example 1), the catalytic filter was impregnated with 5% by mass of dry soot (Printex U, Degussa) by immersion in an ethanol solution containing the soot in suspension. The catalytic filter and soot system was then inserted in a quartz tubular reactor (inside diameter 30 mm, length 800 mm) forming part of a set up designed to evaluate the capacity of the catalytic filter to burn the deposited soot, as a function of the reactor temperature. The test was carried out at constant temperature for 6 hours at 300° C. to simulate real operating conditions. The temperature of 300° C. was chosen knowing that the typical gas temperature output from a diesel engine was more than 275° C. over more than 60% of the time during typical operation, and typically varies between 300° C. and 400° C. during a significant proportion of the operating time; this was as described in the article entitled "Performance and Durability Evaluation of Continuously Regenerating Particulate Filters on Diesel Powered Urban Bases at NY City Transport" by T. Lanni et al., in the SAE (Society of Automotive Engineers) publication No. 2001-01-0511. The system was subjected to a draft by a gas flow containing oxygen (10% by volume), NO (1000 ppm by volume) and helium as the vector gas, with a total of 100 $cm^3$/min, during the experiment. This gas mix was representative of exhaust gases output from a diesel engine.

Figure 2:
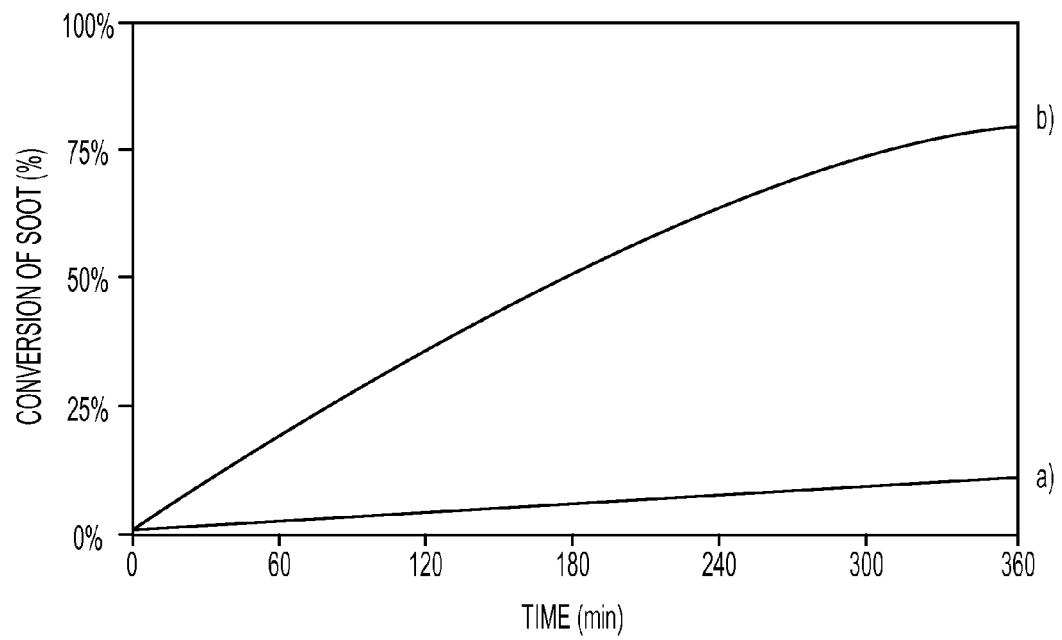
FIG. 2 shows the soot conversion ratio as a function of time at 300° C.:
  (a) Soot only (combustion rate=0.4 mg of soot per hour),
  (b) Soot deposited on a β-SiC foam impregnated with Pt (combustion rate=10.4 mg of soot per hour).

The results obtained are shown in FIG. 2. As we can see, the presence of the catalyst significantly increased elimination of soot by combustion. The soot combustion rate was multiplied by a factor of 26: 10.4 mg of soot/h for catalytic combustion of soot and 0.4 mg of soot/h for non-catalytic combustion of soot. The results show that catalytic combustion of soot can be done on a β-SiC foam impregnated with Pt.

Example 3

Use of Silicon Carbide (β-SiC) Foams with Variable Porosities Catalyzed with Pt Obtained According to Example 1 for Combustion of Soot Particles in Exhaust Gases Output from a Diesel Engine This example illustrates the use of a catalytic filter composed of two foams with different cellular pore sizes in the depollution of exhaust gases output from a diesel engine. The objective was to use two foams impregnated with Pt, in which the pore size was varied so that soot particles output from a diesel engine are burned. To achieve this, we prepared two foams (specific surface area about 10 $m^2/g$), with different cellular pore openings alternately installed to face the exhaust gas inlet in the catalytic filter device: the first had pore openings of 2400 μm, the second 1500 μm. Both were catalyzed with 0.5% by mass of platinum using the method described in Example 1.

The volume of these 2 foams is 60 mL. This filter system was then placed at the output from the exhaust line of a 1.4 L HDI Peugeot 206 (2001 model) placed on a roller test bench. The tests are continued for 10 minutes, with the car running in neutral and at different speeds, 900, 2000 or 3000 rpm. The filter system was heated to 250° C. by a filter collar. The exhaust gases were sampled on the output side of the filter device by the FPS (Fine Particle Sampler) made by Dekati. This instrument dilutes and carries the exhaust gases to the particle analyzer that was an impactor of the "ELPI" (Electrical Low Pressure Impactor) type made by the Dekati company. A control test was done without putting the filter system at the exhaust, to compare the results. The results obtained with the catalytic filter system based on β-SiC were shown in FIG. 3 and compared with the control test. The distributions of the number of particles as a function of the particle size obtained for the control test and for the test carried out using the catalytic filter system clearly shows the efficiency of the system in filtration-combustion of soot particles output from the engine. This filter system reduces the number of particles emitted. The pore size of foams used in the catalytic filter system can be varied in order to minimize the pressure loss and to maximize the particle elimination efficiency. Note that in this test, the volume of the filter medium was very small compared with the volume of a cartridge according to the invention that would be used industrially on the same vehicle.

Example 4

Use of Foams Made of Silicon Carbide (β-SiC) with Various Porosities Catalyzed with Pt Obtained According to Example 1 for Combustion of Soot Particles in Exhaust Gases Output from a Diesel Engine This example illustrates the use of a catalytic filter composed of three foams with different pore sizes used in depollution of exhaust gases derived from a diesel engine. The objective was to use three foams impregnated with Pt in order to burn soot particles derived from a diesel engine. This was done by preparing three foams with different cellular pore openings that were placed one after the other in the catalytic system, in decreasing order of pore size; the first 1750 μm, the second 1100 μm and the third 920 μm. All three were catalyzed with 2% by mass of platinum using the method described in Example 1.

The volume of these three foams was 275 mL. The filter system was thermally insulated and placed at the output from an oxidation section of a muffler on a 1.4 L HDI Peugeot 206 (2001 model) placed on a roller test bench. The tests were carried out as follows:
 preheating phase,
 phase 1: 70 minutes in second gear at an average of 2250 rpm, with a load of 60 N.m.

Exhaust gases were sampled alternately on the outlet side and on the inlet side of the filter device, in order to better evaluate the capacity of the system to eliminate particles. Sampling was done using the FPS (Fine Particle Sampler) made by Dekati. This instrument diluted and carried the exhaust gases to the particle analyzer that was an impactor of the "ELPI" (Electrical Low Pressure Impactor) type made by Dekati. Under these conditions, the temperature stabilized at 245-255° C. during the last 30 minutes of the test. FIG. 4 shows the variation of the pressure loss as a function of time during phase 1 for the two systems (catalyzed and not catalyzed). It shows that the increase in the pressure drop with operating time was slower when the filter system was catalyzed with platinum. A difference of 10 mbars was observed between the catalyzed foams and the non-catalyzed foams at the end of the test (FIG. 4).

Moreover, distributions of the number of particles as a function of the particle size obtained from inlet side and outlet side samples (FIG. 5) show that the global filtration-combustion efficiency of soot particles output from the engine was 50%.

Example 5

Use of Silicon Carbide (β-Sic) Foams with Variable Porosities Catalyzed with Pt Obtained According to Example 1 for Combustion of Soot Particles in Exhaust Gases Output from a Diesel Engine Example No. 4 was reproduced and gases were heated to 265° C. on the inlet side of the filter system. The difference in pressure loss between catalyzed systems and non-catalyzed systems was then 25 mbars at the end of the test, and the global efficiency with which particles are eliminated (measured by ELPI) was 63% for the catalyzed system.

Example 6

Use of Foams Made of Silicon Carbide (β-Sic) with a Homogeneous Porosity Catalyzed with Pt Obtained According to Example 1 for Combustion of Soot Particles in Exhaust Gases Output from a Diesel Engine (Comparative Example)

Example No. 5 was reproduced but the three catalyzed foams with sizes of 1750 μm, 1100 μm and 920 μm, in order, were replaced by three identical catalyzed foams with size 1100 μm. The global efficiency with which particles were eliminated (measured by ELPI) was only 48% while the pressure loss was similar to that in Example 5.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

We claim:

1. A β-SiC foam part having a specific surface area equal to at least 5 m$^2$/g, and comprising at least two zones A and B, each having a different porosity distribution, wherein the foam part was made by chemical transformation of a porous precursor medium comprising at least two blocks A' and B', each having a different porosity distribution, and wherein the at least two zones A and B are derived from the chemical transformation of the at least two blocks A' and B'.

2. The β-SiC foam part according to claim 1, wherein the foam has an average pore size ranging from 500 μm to 4000 μm.

3. The β-SiC foam part according to claim 2, wherein the foam has an average pore size ranging from 800 μm to 4000 μm.

4. The β-SiC foam part according to claim 3, wherein the foam has an average pore size ranging from 900 μm to 3000 μm.

5. The β-SiC foam part according to claim 4, wherein the foam has an average pore size ranging from 900 μm to 1800 μm.

6. The β-SiC foam part according to claim 1, wherein the density of the foam part ranges from 0.05 g/cm$^3$ to 0.5 g/cm$^3$.

7. The β-SiC foam part according to claim 1, wherein the density of the foam part ranges from 0.1 g/cm$^3$ to 0.2 g/cm$^3$.

8. A β-SiC foam part prepared using a process comprising:
 (a) preparing a precursor medium comprising a carbonizable foam having an open cellular porosity and a predefined porous distribution, the precursor medium being impregnated with a hardening resin;
 (b) cross-linking the resin;
 (c) pyrolizing the foam to form carbon foam;
 (d) activating the carbon foam; and
 (e) exposing the activated carbon foam to an SiO vapor to form silicon carbide foam, wherein
  the beta-SiC foam comprises at least two zones, each of said at least two zones having a different porosity distribution.

* * * * *